Nov. 27, 1962
L. L. ANTES
3,065,515
PROCESS FOR MAKING CADMIUM SULFIDE
PHOTOCONDUCTING ARTICLES
Filed April 9, 1956
4 Sheets-Sheet 1
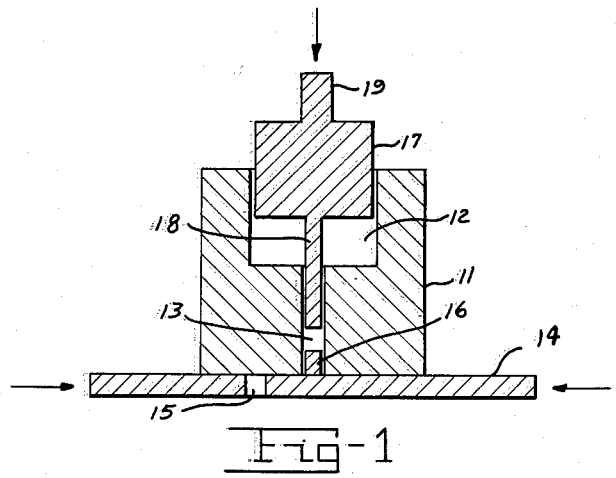
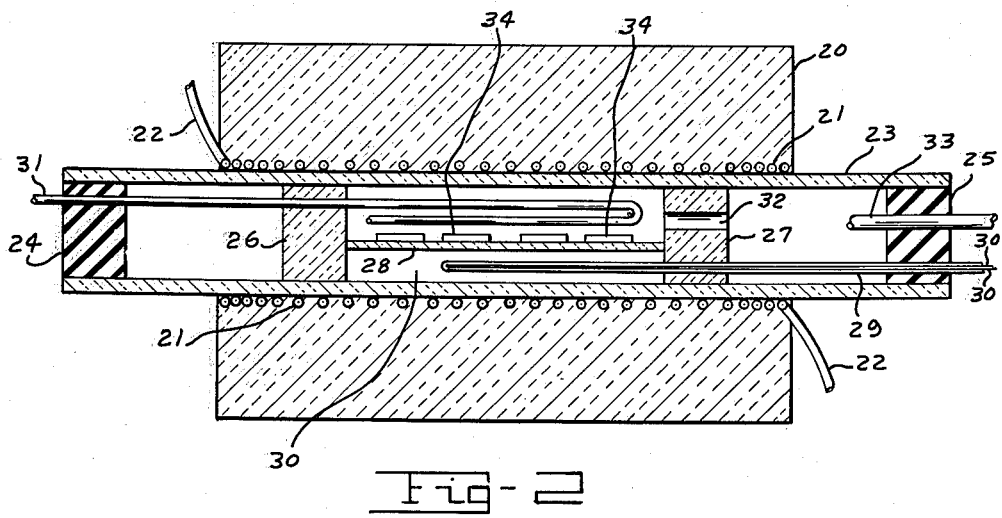
INVENTOR.
LELAND L. ANTES
BY Wade Koontz
Lloyd B. Stevens, Jr.
ATTORNEYS

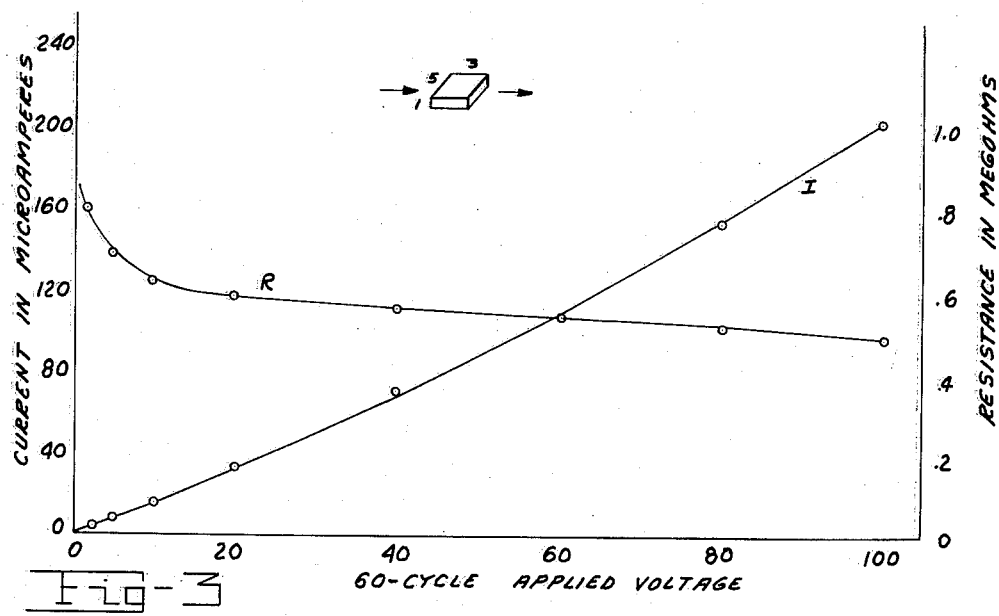
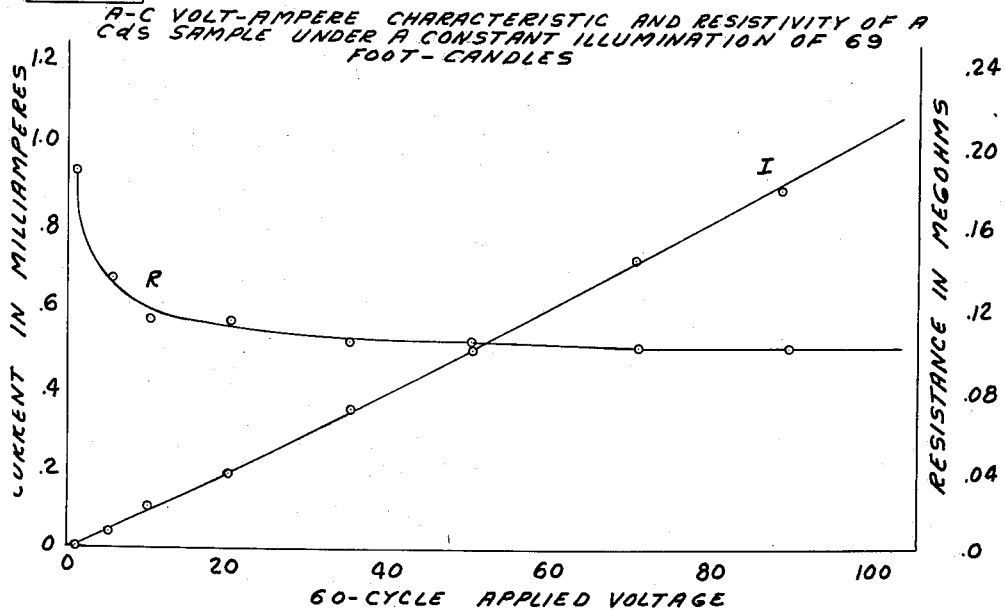

Nov. 27, 1962

L. L. ANTES 3,065,515

PROCESS FOR MAKING CADMIUM SULFIDE
PHOTOCONDUCTING ARTICLES

Filed April 9, 1956

INVENTOR.
LELAND L. ANTES
BY
Lloyd B. Stevens
ATTORNEYS

Nov. 27, 1962

L. L. ANTES 3,065,515

PROCESS FOR MAKING CADMIUM SULFIDE
PHOTOCONDUCTING ARTICLES

Filed April 9, 1956

INVENTOR.
LELAND L. ANTES
BY
Lloyd B. Stevens, Jr.
ATTORNEYS

United States Patent Office 3,065,515
Patented Nov. 27, 1962

3,065,515
PROCESS FOR MAKING CADMIUM SULFIDE PHOTOCONDUCTING ARTICLES
Leland L. Antes, Dayton, Ohio, assignor to the United States of America as represented by the Secretary of the Air Force
Filed Apr. 9, 1956, Ser. No. 577,181
9 Claims. (Cl. 25—157)

This invention relates to a process for making cadmium sulfide photoconductor articles by forming the article from powdered cadmium sulfide and heat treating to make the article photoconductive.

There are other methods known for producing photoconducting articles, for example, in order to produce cadmium sulfide photoconducting cells one standard process is to dip a cadmium sulfide crystal, or slab of such material as glass on which a layer of cadmium sulfide has been evaporated, into a homogeneous mixture of cadmium sulfide and a chosen activator or activators reduced to a fine powder. Then the vessel containing the crystal or slab together with the powder is heated at a substantial temperature of 500° C. Thermodiffusion produces an equilibrium between the activator content of the crystal, or the evaporated layer on the one hand, and of the mixture on the other.

Such processes are not without drawbacks. The crystals are very difficult to prepare, their size is seldom large enough, seldom more than one centimeter, and thickness is also very small, less than one millimeter, and the brittleness makes them difficult to handle.

The dimensions of evaporated layers may be large but they are very thin; they take a long time to prepare, therefore, their price is high. Besides, the evaporated layers have a lacunary structure and, owing to this structure, there appears, in series with the resistance that varies according to the illumination, a parasitic resistance independent from the illumination which results in a diminution of the responsivity of the cell.

It is an object of this invention to provide a low-cost mass production method of producing cadmium sulfide photoconductor articles.

It is another object of this invention to provide a method for making large slabs or shapes, capable of carrying milliamperes, rather than microamperes, suitable for operating relays directly using only a few volts with sufficient illumination.

It is a further object of the invention to provide a low-cost method of forming large photoconducting articles from powdered cadmium sulfide involving forming and activating the article, in the absence of substantial applied pressure, in a single heating step wherein the powder is heated in a mold.

It is an additional object of this invention to provide a low-cost mass production method of making photoconducting cadmium sulfide articles involving forming the article from powdered cadmium sulfide by pressure application and subsequently heating the formed article to give it photoconductive properties.

These and other objects of the invention will become apparent as the detailed description of the invention proceeds.

The above objects and other objects are accomplished by my invention which is a process for producing cadmium sulfide photoconductive articles formed from powdered cadmium sulfide, wherein the article is made by heating the powder in a mold in the absence of substantial applied pressure to form a dense solid having photoconductive properties, or the powder is compressed, preferably at ambient temperatures, to form a dense solid article and, the formed article is heated to make it photoconductive. It is preferred that the powder used in the process consist of particles less than about 200 microns size and the smaller the particles the better. The cadmium sulfide should be substantially pure, i.e., should contain less than about 0.01% impurities, but it can contain known activators such as copper, silver, gold, lead, nickel, etc., in excess of 0.01%. Activators such as Mn, Zn, Cl and O are also effective. Electrodes can be placed on the photoconductive articles by painting the article with silver paint or by other well-known means. For most uses it is preferred to make the articles by pressure forming and subsequent heat treatment. The heating step must always be done in the presence of a blanketing atmosphere such as $H_2S$, steam, nitrogen, etc. If steam is used as the blanketing atmosphere, it can contain a minor amount of air, but this is not required. If the forming is accomplished by heating the powder at atmospheric pressure, a temperature between about 850° C. and 950° C. must be used to cause the powder to fuse into a unitary dense article. If the article is formed in a separate compression step at ambient temperatures it is possible that a lower temperature than 850° C. can be used in the heating step, and temperatures in the range of about 450° C. to 1000° C. can be used.

The invention will be more clearly understood from the following detailed description of specific examples thereof read in conjunction with the accompanying drawings wherein:

FIG. 1 is a cross sectional view of a press suitable for forming the articles;

FIG. 2 is a cross sectional view of a furnace suitable for heat treating the articles to make them photoconductive;

FIGS. 3, 4, 5, 6 and 7 are graphical presentations of experimental testing of a sample made as described in Example 5.

Figure 5:
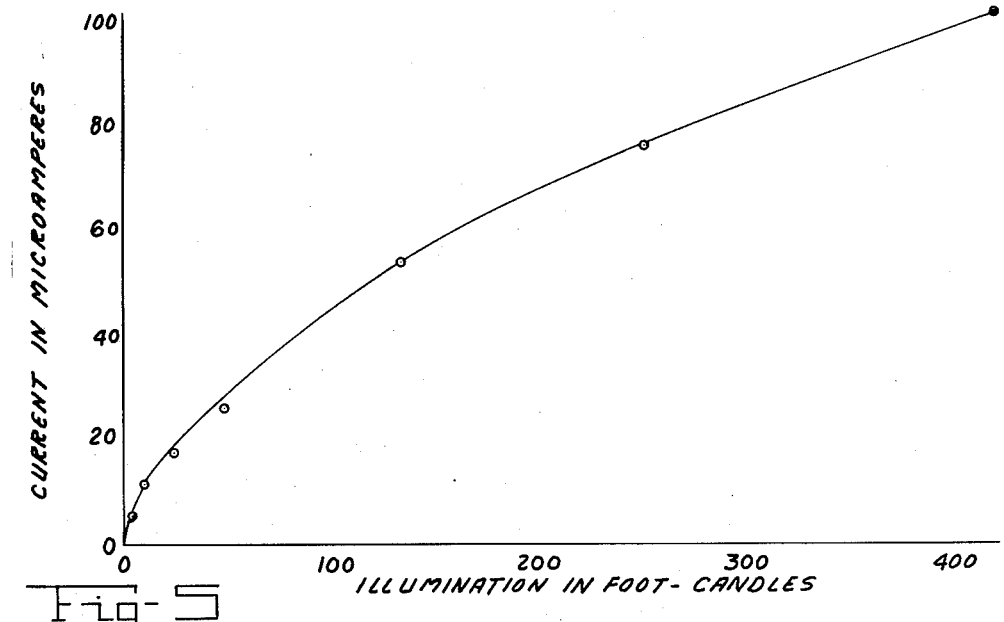

Examples 1, 2 and 3 describe the making and testing of photoconductive articles produced by heating powdered cadmium sulfide at atmospheric pressure in a Vycor test tube to form the article and make it photoconductive.

*Example 1*

A test tube filled and packed with cadmium sulfide powder was heated in an $H_2S$ atmosphere at 900° C. to attempt to grow polycrystallites from the powdered CdS ($H_2S$ present to prevent decomposition). A hard "pencil" of CdS having the same shape as the inside of the test tube, but approximately one-half the dimensions, resulted.

*Example 2*

The "pencil" from Example 1 was heated for 45 hours at 925° C. in an atmosphere of $H_2S$. The treated pencil had the following volt-ampere characteristics for 200 foot candles of illumination:

| Applied Voltage, Volts | Current Side 1, ma. | Current Side 2, ma. | Maximum Side 2, ma. |
|---|---|---|---|
| 0 | 0 | 0 | 0 |
| 22.5 | 0.31 | 0.39 | 0.40 |
| 45.0 | 0.62 | 0.83 | 1.3 |
| 67.5 | 1.13 | 1.43 | 2.30 |

The pencil had the propery of slowly building up conductivity when illumination was increased. When illuminated briefly (open circuit), the dark conductivity was greater momentarily than before the light exposure. The conductivity increase produced by the momentary action of light and without an applied voltage would remain in effect for some time. When it was connected with a circuit (not in the presence of light) to measure its current and voltage characteristics, it showed the increased conductivity which disappeared slowly to the normal dark conductance.

Example 3

Run as Example 1 with 6 hours heating. A hard CdS pencil resulted. It had somewhat the same properties as described in the previous example but not to quite the extent.

For most uses it is preferred to prepare the photoconductive articles by the method illustrated in Examples 4, 5, 6, 7 and 8. Normally this method should be faster since in the other method heating for an extended period at high temperature is required to form the article. Equipment useful in carrying out the method of the Examples 4, 5, 6, 7 and 8 is described in FIGS. 1 and 2. This method will be described particularly with reference to these figures.

FIG. 1 shows a press suitable for forming the articles. The body portion of the press is a cylindrical piece 11 which has a large diameter cylindrical recess 12 in its upper end and a small diameter cylindrical recess 13 in its lower end, which communicates with recess 12. In its assembled form body portion 11 rests on the plate 14 having a cylindrical opening 15 therethrough. Cylindrical opening 15 is substantially the same size as opening 13. A small cylindrical plug 16 is positioned at the lower end of opening 13. Pressure is applied via piston 17 which has a small diameter cylinder extension 18 at its lower end and a somewhat larger cylindrical extension 19 at its upper end.

The body portion 11 of the press is positioned as shown in FIG. 1 with plug 16 contained therein at the start of the article forming step. Piston 17 has not yet been positioned within the body portion. Opening 13 is filled with powdered cadmium sulfide which may be tamped into place and additional cadmium sulfide added with tamping to substantially fill opening 13. The tamping step is not a mandatory step, and probably would not be used in high-speed mass-production machinery. Then the lower end of cylindrical portion 18 of piston 17 is exerted in the direction shown by the arrow at a pressure of about 20 to 30 tons per square inch to form the cadmium sulfide powder into a dense solid article. Then plate 14 is moved from right to left to position opening 15 in axial alignment with opening 13, and the formed article and plug 16 are forced by the piston from the press. This completes the forming step for the article.

The heat treating furnace for activating the articles is described in FIG. 2. The heating mantle for the furnace is cylinder 20 which is made of suitable insulating material and has a cylindrical opening axially therethrough. Near the inner surface of the opening and within the body of the heating mantle resistance wire having turns 21 and leads 22 is secured. A quartz tube 23 is positioned in the opening in the heating mantle as shown. Rubber stoppers 24 and 25 are used to close the ends of quartz tube 23. To better isolate the samples within a limited space surrounded by the heating mantle, insulating plugs 26 and 27 are positioned within tube 23 as shown. A quartz plate 28 suspended from sides of tube 23 serves as a support for the formed article during heat treatment. A small quartz tube 29 closed at one end and having thermocouple leads 30 and 31 therein extends through rubber stopper 25 and plug 27 into space 30 which is provided for heat treating the samples. A U-shaped quartz tube 31 extends through rubber stopper 24 and insulating plug 26 into space 30 to provide for the entry of blanketing gas during the heat treating step. This tube 31 is U-shaped within space 30 to allow blanketing gas to be preheated prior to its release into the space, and opening 32 is provided in insulating plug 27 to allow the escape of the blanketing gas from space 30. Escape of the blanketing gas from quartz tube 23 is provided by tube 33 which extends through an opening at a rubber stopper 25. The samples being heat treated as indicated by articles 34.

In a heat treating operation the furnace is assembled as shown. Blanketing gas is admitted around the samples through tube 31 and the furnace is heated by resistance wire 21. Temperature of the heat treating can be measured by the thermocouple. When the heat treating is finished it is preferred to cool the samples down within the furnace in the presence of the blanketing gas. The furnace is then disassembled and the samples removed.

The photoconductive articles are now formed except for the addition of the electrodes which can be done as described above.

As illustrations of materials made using equipment similar to that shown in FIGS. 1 and 2, and by the method described using this equipment, a number of examples will be described in detail below.

Example 4

A run was made in $H_2S$ at 950° C. using three compressed pellets of CdS, two of which were used in previous experiments. The third was formed freshly from CdS powder compressed to 40 tons p.s.i. The two old pellets did not show a photoconductivity but the new one conducted to the extent of 4 ma. (at 22½ volts) in indoor daylight. Apparently the two older samples had become deactivated by previous testing which was too severe.

Example 5

Figure 6:
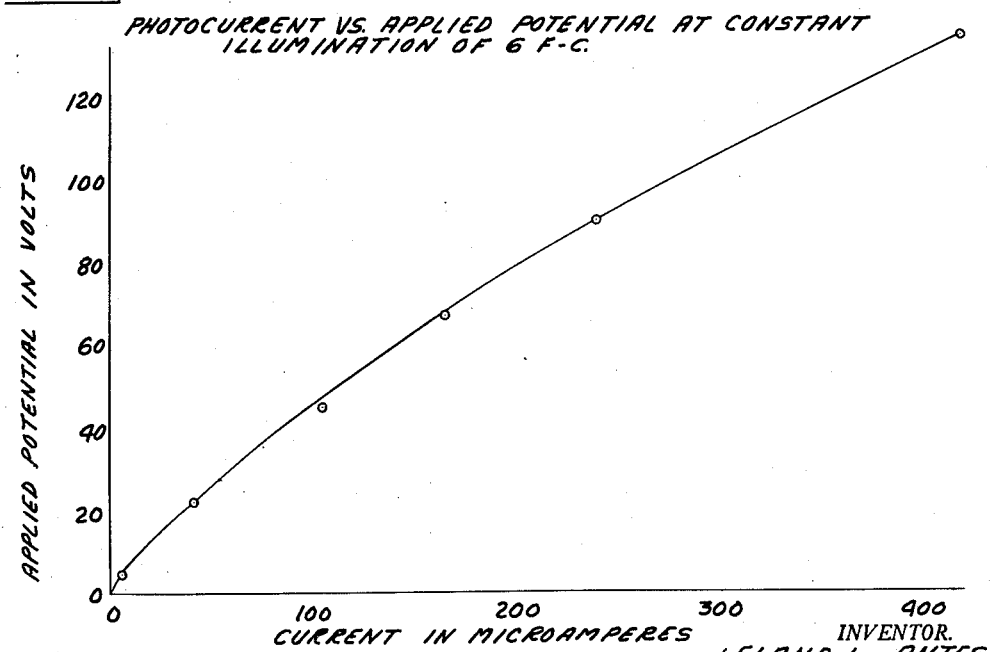
Figure 7:
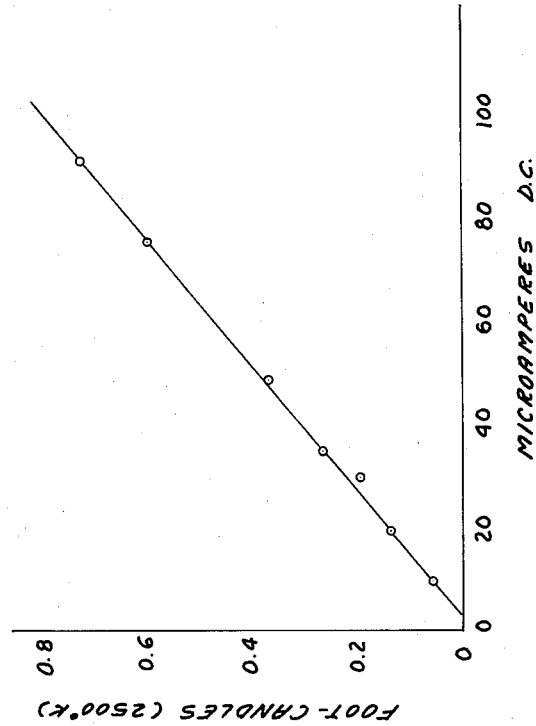

Several pellets of CdS powder formed at 20 tons p.s.i. were heated at 900° C. approximately for several hours in a steam atmosphere only (no hydrogen sulfide; however, air did enter at one time while the furnace was hot). The resulting orange-yellow blistered chips were very photoconductive. Characteristics of one of these chips are shown by the graphs, FIGS. 3, 4, 5, 6 and 7. With A.C. voltage applied, the crystals saturated in the dark. In the light, above 0.7 volt R.M.S. the crystals showed a nonlinear characteristic.

Example 6

30-ton p.s.i. pressure CdS pellets were heated for ½ hour at 920° C. in steam. The resulting sample showed rectifying properties on a cathode ray oscilloscope screen when A.C. voltage was first applied. The samples were slightly photoconductive. The change in conductivity when irradiated with a flash light caused 5–20% increase in conductivity. The conductivity of the samples became greater if heavy currents were passed through the sample at 30-volts R.M.S. The conductivity gradually became greatly reduced, but did not disappear completely with passage of time and with no voltage applied.

Example 7

A sample as the previous sample was run for 2 hours at temperatures above 500° C. (which at one time on the maximum heating curve reached 920° C.) in steam. The samples showed some photoconductivity and nonlinearity. One sample began to conduct only when the A.C. applied voltage was raised to about 3 volts maximum. This "Thyratron"-like action observed on a cathode ray oscilloscope screen was not started by radium emanation. Light would cause conduction to occur at a lower voltage only if left on for some time.

Example 8

30-ton p.s.i. pellets were heated in steam for about 2 hours just above a nominal temperature of 900° C. (for 3 hours at temperatures about 500° C.). The samples from the hottest part of the furnace were very dark. The lighter samples taken from the cooler parts of the furnace showed photoconductivity increases of 300% for a flash light at voltages below 0.3 R.M.S. At voltages up to 1.0 volt the range of the observable effect spread out (it previously had been concentrated at the electrodes). The conductance was linear.

Some rectification and photo effects were present at low voltages, but at higher voltages and larger currents the effects vanished and the samples became permanently conductive.

All showed some photoconductivity at low voltages which was easily destroyed by raising the voltage.

The articles produced in Examples 4, 5, 6, 7 and 8 above had a diameter of about 1″. Electrodes were added to the articles by painting small areas with "Metaplast," a colloidal silver paint.

In testing the CdS pellets and pencils two distinct types of phenomena were observed, one occurred only at the electrodes and the other appeared throughout the body of the material. At the point of contact of the silver paint with the CdS, it was often found that very large photoconductivity and rectifying effects existed for voltages below 0.5 volt. These effects might be associated with one electrode or sometimes with both and were also quite nonlinear with respect to the voltage applied. Continued increase of voltage also had the effect of destroying these electrode effects, leaving the samples much more conductive than before the higher voltage had been applied.

On the other hand, many of the samples showed a photoconductivity throughout the mass of the material. This applied to the pencils and to the pellets. It was found that light exposure on a small area of the samples rendered them conductive between electrodes. This seems to indicate that the electrons are released by the absorption of photons and that these electrons almost immediately permeate the entire specimen, thereby increasing its conductivity.

The effect of light exposure on conductivity may be found in the dark when voltages are first applied to a sample previously exposed.

An advantages of the process lies in the ability to produce large blocks or shapes capable of carrying milliamperes rather than microamperes and often at lower voltages than specified for use with similar crystals. Relays may be operated directly using only a few volts with sufficient illumination.

Although the invention has been described in terms of specified apparatus and examples set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention or of the scope of the appended claims.

What is claimed is:

1. A method of making a photoconductive article comprising step 1 of forming said article by compressing powdered cadmium sulfide into a dense solid, and subsequently heating the product of step 1 in the presence of a blanketing, nonreactive atmosphere at a temperature between about 450° C. and 1000° C. for a time necessary to give the article photoconductive properties.

2. The method of claim 1 wherein said blanketing atmosphere is steam.

3. The method of claim 1 wherein said blanketing atmosphere is steam containing a minor amount of air.

4. The method of claim 1 wherein said blanketing atmosphere is hydrogen sulfide.

5. A method of making a photoconductive article comprising the steps of forming said article by compressing cadmium sulfide particles of a size of less than 200 microns into a dense solid, and subsequently heating the formed product in the presence of a blanketing non-reactive atmosphere at a temperature between 450° C. and 1000° C. for a time necessary to give the article photoconductive properties.

6. The method of claim 5 wherein said blanketing atmosphere is steam.

7. The method of claim 5 wherein said blanketing atmosphere is hydrogen sulfide.

8. The method of producing a photoconductive device of the cadmium sulfide type which comprises molding granules of cadmium sulfide into a coherent pellet, and thereafter heating said pellet to a sintering temperature to cause coalescence of the granules into crystals of size greater than said granules.

9. The method of producing a photoconductive device of the cadmium sulfide type which comprises compacting a quantity of cadmium sulfide particles into a coherent body, and thereafter heating said body at a temperature between about 850° C. and 900° C. for about 15 minutes to cause sintering of said particles.

References Cited in the file of this patent

UNITED STATES PATENTS

| | | |
|---|---|---|
| 747,800 | Stone | Dec. 22, 1903 |
| 2,403,026 | Saslaw | July 2, 1946 |
| 2,497,140 | Schulman | Feb. 14, 1950 |
| 2,651,700 | Gans | Sept. 8, 1953 |
| 2,710,813 | Forgue | June 14, 1955 |
| 2,742,438 | Thomsen | Apr. 17, 1956 |
| 2,782,180 | Weidman | Feb. 19, 1957 |
| 2,843,914 | Koury | July 22, 1958 |